United States Patent [19]

D'Aquila et al.

[11] Patent Number: 5,402,057
[45] Date of Patent: Mar. 28, 1995

[54] SYSTEM AND METHOD FOR COORDINATING SHUNT REACTANCE SWITCHING

[75] Inventors: Robert D'Aquila, Schenectady; Nicholas W. Miller, Delmar, both of N.Y.

[73] Assignee: General Electric Co., Schenectady, N.Y.

[21] Appl. No.: 874,151

[22] Filed: Apr. 27, 1992

[51] Int. Cl.⁶ .................................................. G05F 1/70
[52] U.S. Cl. .................................. 323/211; 323/255; 323/258
[58] Field of Search ............... 323/210, 211, 233, 255, 323/256, 257, 258, 343

[56] References Cited

U.S. PATENT DOCUMENTS

| 4,047,097 | 9/1977 | Gyugi et al. | 323/119 |
| 4,104,576 | 8/1978 | Frank | 323/102 |
| 4,359,678 | 11/1982 | Raivola et al. | 323/211 |
| 4,567,424 | 1/1986 | Dobsa et al. | 323/210 |
| 5,136,233 | 8/1992 | Klinkenberg et al. | 323/343 |
| 5,155,672 | 10/1992 | Brown | 363/43 |

Primary Examiner—Steven L. Stephan
Assistant Examiner—Adolf Berhane
Attorney, Agent, or Firm—Nixon & Vanderhye

[57] ABSTRACT

A system and method for coordinating shunt reactance switching in a system with a transformer having a primary voltage and a secondary voltage for supplying low voltage power to a load. Voltage and power meters are provided for measuring the primary voltage and the reactive power flowing to the load. A programmable logic controller receives as one set of inputs measurements of primary voltage and reactive power flowing to the load, and as another set of inputs, predetermined ranges establishing high and low limits for the primary voltage and the reactive power. Based on these inputs, the programmable logic controller connects or disconnects at least one shunt reactance to maintain the load voltage substantially constant.

12 Claims, 11 Drawing Sheets

SYSTEM AND METHOD FOR COORDINATING SHUNT REACTANCE SWITCHING

FIELD OF THE INVENTION

The present invention relates to coordinating shunt reactance switching in power transmission and/or supply systems, and in one embodiment, for coordinating shunt compensation switching with load tap change transformers.

BACKGROUND AND SUMMARY OF THE INVENTION

Voltage fluctuations on high voltage AC transmission lines can be reduced by installing static reactive power generators (sometimes known as VAR generators) along the transmission lines. Voltage regulation is based on the fact that in an essentially inductive transmission line, voltage increases if capacitive current is injected into the line by, for example, connection of a shunt capacitor across the line/load. Alternatively, voltage can be decreased by connecting an inductor across the line (or removing a previously connected capacitor). Static VAR generators may be switched across the line using electromagnetic relay devices controlled by a predetermined timer or using a thyristor (or other semiconductor) switching control network such as that disclosed in U.S. Pat. No. 4,353,024 to Gyugyi.

A problem facing many utilities is controlling shunt compensation on voltage buses especially where voltage is already regulated by load tap change (LTC) transformers. In an LTC transformer, the low side line voltage delivered to the load is monitored and regulated by a conventional, fine tuning LTC controller. Such a controller measures actual low side voltage, compares it with the desired value, and then adjusts the position where the load tap makes contact with the low side LTC transformer coil, e.g., via a control signal to a motorized tap changer. Typical LTC transformers may have 16 or 32 tap positions, with each position being representative of some fractional portion of rated voltage. Thus, for example, a one position tap change on a 32 tap LTC transformer would cause a relatively small line voltage change as compared with the rated or desired output voltage.

In operation, an LTC transformer compares the secondary voltage with both a minimum and a maximum voltage threshold. If either threshold is exceeded, a timer is started. If the time exceeds a predetermined delay period, the LTC controller moves the tap to increase or decrease the secondary voltage as necessary.

LTC transformers function well to effect small changes in voltage. However, large voltage fluctuations require switching of shunt reactances to ensure that sufficient reactive power is provided to the system, end-users and customers such that secondary voltage can be held essentially constant. Since the LTC controller is already monitoring and regulating the secondary distribution voltage, a shunt reactance control unit cannot also directly control that secondary distribution voltage. As a result, most utilities typically follow a fairly rigid load cycle to estimate roughly when a reactance element, such as a capacitor bank, should be switched in shunt across the load to offset a decrease in the secondary distribution voltage from an increased load. After capacitor bank switching, the LTC controller gradually adjusts the tap to return the low side voltage to the desired value. This rigid scheduling is far from optimal because it fails to accurately respond to actual system needs (as opposed to scheduled estimates) and to detect abnormal system conditions.

The present invention seeks to overcome these problems by flexibly coordinating the LTC fine tune controller and shunt reactance switching. More specifically, the present invention provides voltage and power regulation using a programmable logic controller for controlling shunt capacitor switching in order to attain the following exemplary objectives:

(1) maintain distribution and transmission voltages;
(2) track station loading;
(3) complement the action of LTC transformers;
(4) provide sufficient deadband and time delays to avoid hunting; and
(5) detect and compensate for abnormal system conditions.

In one embodiment, the present invention provides a system for coordinating shunt reactance switching in a power distribution substation which includes a transformer having a primary voltage and a secondary voltage for supplying low voltage power to a load. Voltage and power meters are provided for measuring the primary voltage and the reactive (or real) power flowing to the load. A programmable logic controller receives as one set of inputs measurements of primary voltage and reactive (or real) power flowing to the load, and as another set of inputs, predetermined ranges establishing high and low limits for the primary voltage and the reactive (or real) power. Based on these inputs, the programmable logic controller connects or disconnects at least one shunt reactance across the load to maintain the load voltage substantially constant.

The present invention is particularly well suited to coordinate shunt reactance switching with LTC transformers. An LTC controller monitors the secondary voltage and adjusts the tap contact position in response to secondary voltage variations. The present invention is also applicable as well to power transmission lines for delivering secondary voltages to a variety of loads. In both environments, a primary voltage of the LTC transformer or the transmission line system is monitored along with reactive power to a load.

The programmable logic controller uses the predetermined ranges for primary voltage and reactive power to determine a deadband range of operation in which no reactance switching is necessary. The deadband range and switching determination are based upon a mathematical model formulated as a function of (1) primary or high side voltage and (2) power flowing to the load. If that function exceeds a calculated deadband range, an error is calculated, and integrated, over time. When the integrated error exceeds a preset value, reactance switching occurs.

The present invention also includes a method for coordinating shunt reactance switching with an LTC transformer having a high voltage side and a low voltage side for supplying low voltage to a load including the steps of: (1) adjusting the position of an adjustable tap contacting windings on the low voltage side in response to variations in the low side voltage; (2) measuring the high side voltage and reactive power flowing to the load; and (3) switching at least one reactance in shunt with the load to maintain a substantially constant low side voltage based on the measurements in step (2) and on predetermined ranges for the high side voltage and reactive power. The method may further include calculating a deadband range of operation in which no reactances are switched and outside of which reactances are switched.

The present invention will allow for controlled switching at a location within the "load" network that is physically outside of the power distribution substation. That is, the switched reactances can be at other buses which are electrically connected through low side system impedances (lines, cables, etc.) to the LTC transformer. This switching of remotely located reactive elements will require communication circuitry of the variety readily available through normal SCADA (system control and data acquisition) systems.

The present invention also includes a method for regulating shunt reactance-switching in a power transmission system providing a plurality of distribution voltages including a first voltage and a second voltage for supplying power to a load including the steps of (1) measuring the first voltage and reactive power flowing towards the load, and (2) switching at least one shunt reactance to maintain the second voltage substantially constant based on the measurements made in step (1) and predetermined ranges for the first voltage and reactive power. The method further includes the steps of inputting predetermined ranges which include a minimum second voltage, a maximum second voltage, a minimum reactive power, and a maximum reactive power, and calculating a deadband range of operation in which no reactances are switched and outside of which reactances are switched based on those predetermined ranges.

BRIEF DESCRIPTION OF THE DRAWINGS

These and other features and advantages of the invention will be readily apparent to one of ordinary skill in the art from the following written description, read in conjunction with the drawings, in which.

DETAILED DESCRIPTION OF EXEMPLARY EMBODIMENTS

In the following description, for purposes of explanation and not limitation, specific embodiments are set forth, including particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as to not obscure the description of the present invention with unnecessary detail.

The present invention will be described in one exemplary embodiment in the context of a LTC transformer in conjunction with FIG. 1. LTC transformer 10 includes primary (P) and secondary (S) windings 12, 14, respectively, for stepping down a high primary voltage, for example, 115 kV to a lower secondary voltage, for example, 26 kV. An LTC controller 16 functions in the conventional way as described above to monitor the secondary distribution voltage to a load 18 and to adjust the tap position of variable tap 17 in order to maintain a substantially constant secondary voltage.

A conventional volt meter 20 is shunted across the primary winding 12 in order to detect the primary voltage. A conventional power meter 22 measures the reactive power flowing to load 18 by measuring the voltage across the load and the current flowing to the load as indicated by coil 24. Shunt reactances 26 and 28 (illustrated as capacitors) are connected in shunt to the load via switches S1 and S2. It will be appreciated by those skilled in the art that shunt reactances 26 and 28 could be either capacitors or inductors and that switches S1 and S2 could be any type of electromechanical (relays) or semiconductor (thyristor) switches.

A programmable logic controller 30 receives a number of inputs including voltage readings from volt meter 20 and reactive power readings from power meter 22. In addition, the programmable logic controller 30 receives user inputs including an error threshold, upper and lower primary voltage limits, and upper and lower reactive power limits. Outputs of programmable logic controller 30 include control signals to relay drivers 32 and 34 for controlling the state of switches S1 and S2 for switching the shunt reactances 26 and 28 into or out of the network. It will be understood by those skilled in the art that any number of shunt reactances may be included in the present invention.

Figure 1:
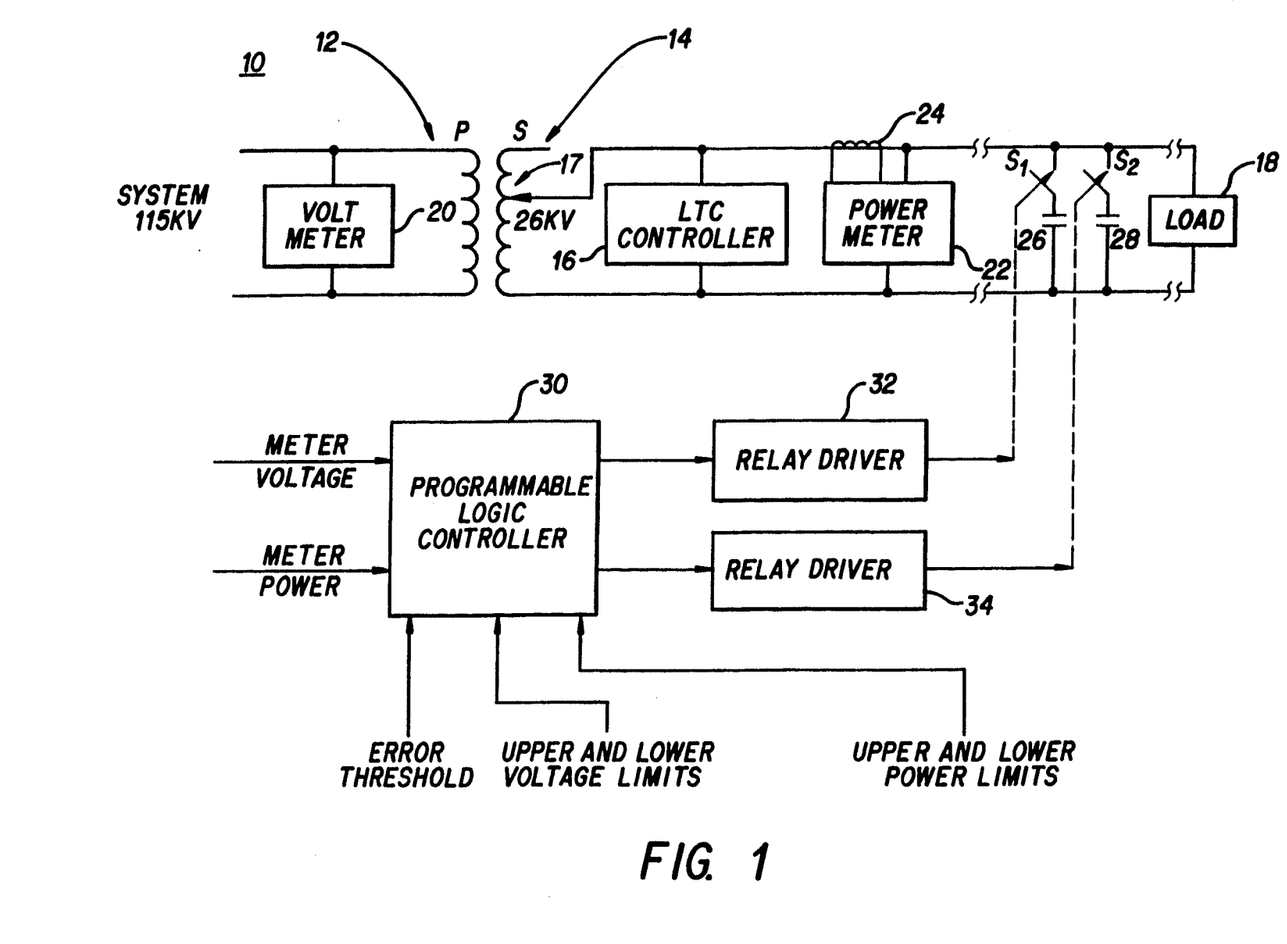
FIG. 1 is an exemplary functional block diagram in which the present invention is applied to an LTC transformer with shunt reactances and load residing at physically separate locations.

FIG. 1 also illustrates that the reactive devices S1 (26) and S2 (28) may if desired be remotely located on a secondary network and may be remotely located from load 18. It will be understood by those skilled in the art that a variety of locations exist for the measurement devices, switches, and loads.

Figure 2:
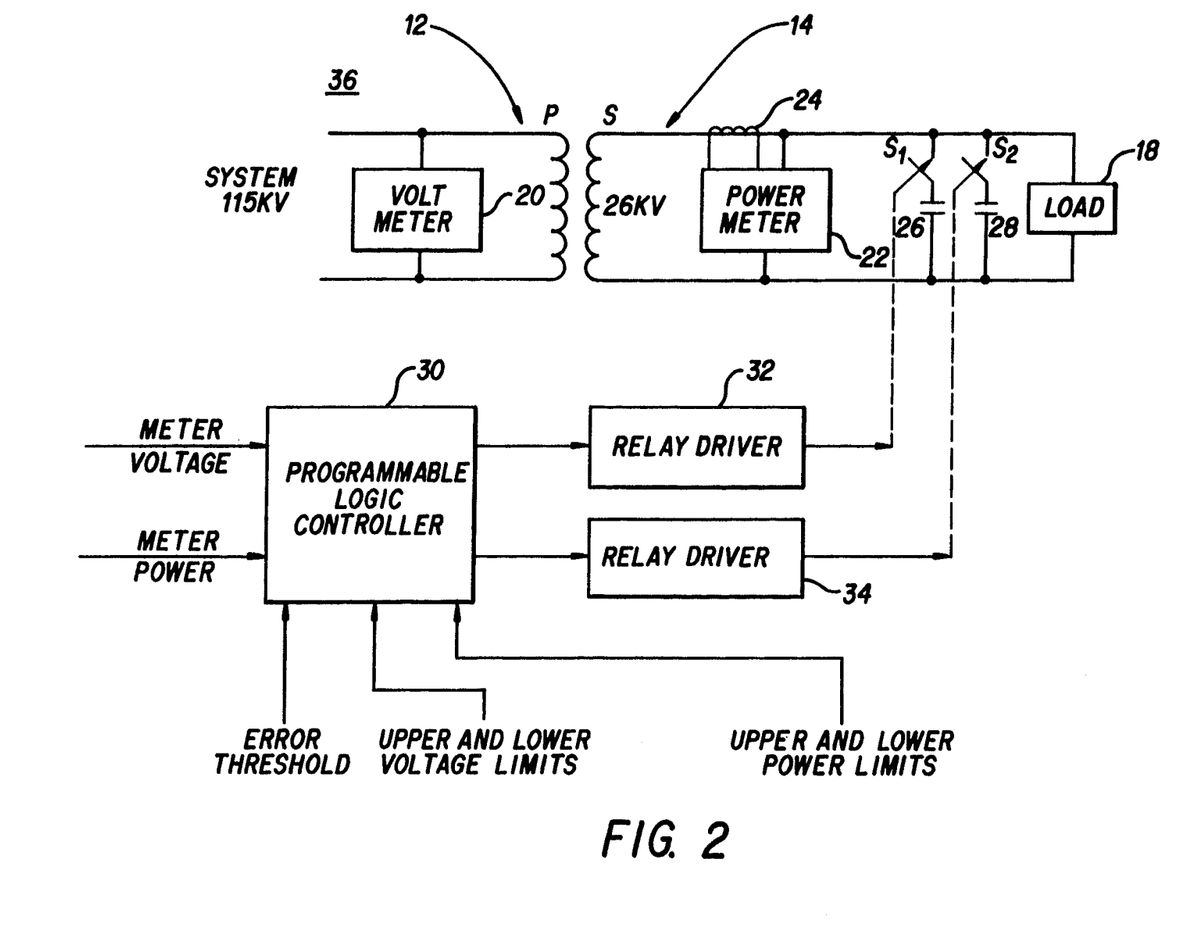
FIG. 2 is an exemplary functional block diagram of the present invention applied to a standard transformer.

FIG. 2 illustrates another exemplary embodiment of the present invention as it is applied to a conventional transformer 36. Like numerals refer to like elements as previously defined in FIG. 1. In FIG. 2, the LTC controller 16 and the variable tap 17 have been removed from the network. Otherwise, the elements and operation of the system in FIG. 2 are similar to that disclosed above with respect to FIG. 1.

Figure 3:
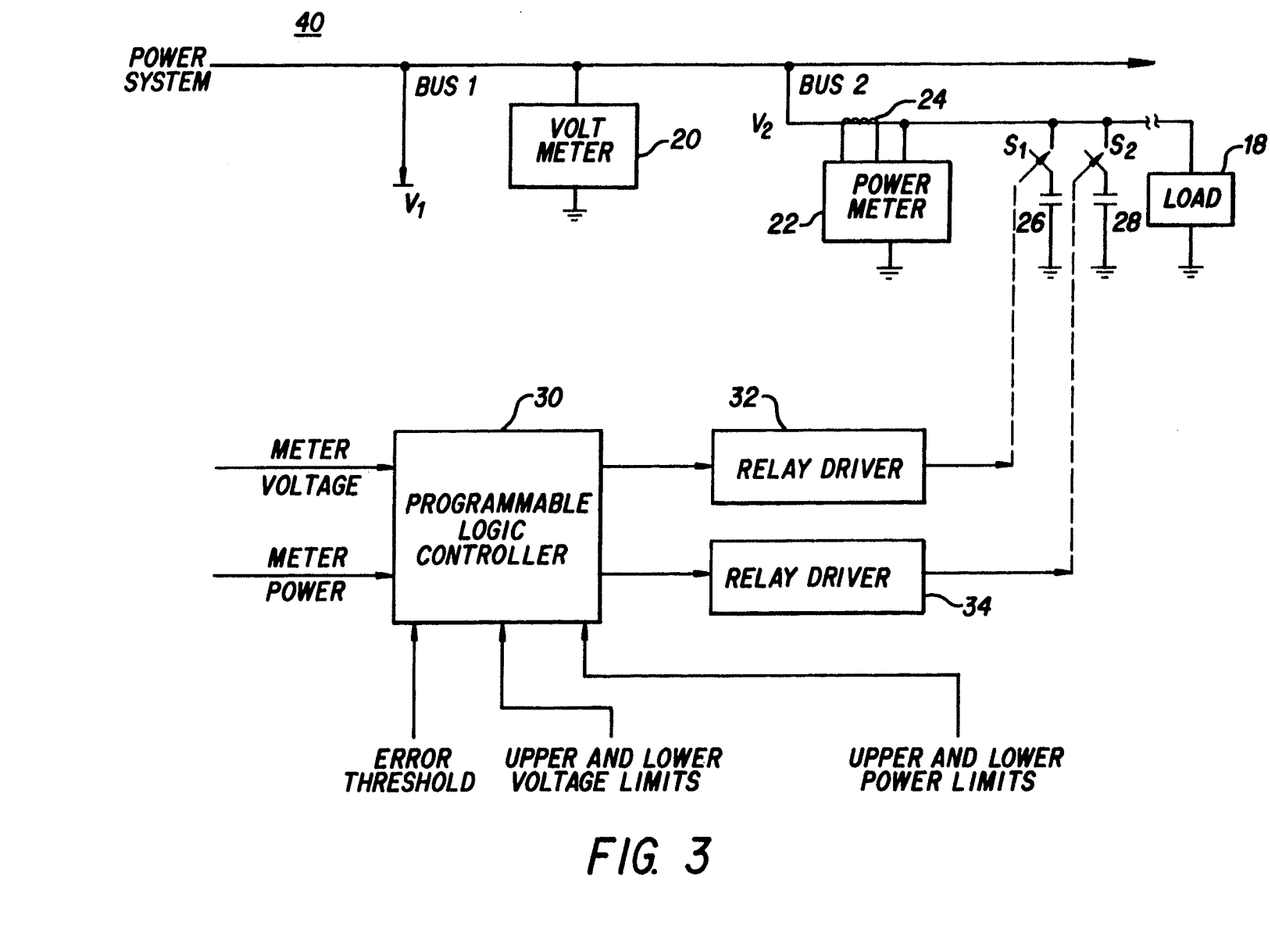
FIG. 3 is an exemplary functional block diagram of the present invention applied to a transmission line having plural distribution buses.

A third exemplary embodiment of the present invention is illustrated in FIG. 3 as applied to a power supply system 40. Plural buses, for example bus 1 and bus 2, supply different voltages V1, V2, etc. to various loads. Assuming that the present invention is applied to regulate the secondary voltage V2 delivered to load 18, a volt meter is placed across distribution bus 1 to determine primary voltage V1. The reactive power flowing towards load 18 is measured using power meter 22 and coil 24 as described above. Otherwise, the elements and operation of the system in FIG. 3 are similar to that disclosed above with respect to FIG. 1.

The secondary voltage need not be identical to the actual load voltage. In fact, when the present invention, as shown in the exemplary third embodiment, is applied to two levels of transmission voltage, the primary voltage could be an EHV ("extra high voltage," e.g. 500 kV) and the secondary voltage might be an HV ("high voltage," e.g. 230 kV). In such a situation, the 230 kV HV system would be considered the "load."

For each of the three embodiments described above, the present invention operates essentially to regulate the voltage to the load and to switch shunt reactances as necessary to ensure that the load voltage remains essentially constant. The primary "engine" of the present invention is programmable logic controller 30, e.g. a suitable programmable logic controller is available from GE.Fanuc. Current software for programming programmable logic control 30 is also conventional, e.g. Ladder Logic ™ software is available from GE.-Fanuc. Those of ordinary skill in the art will of course appreciate that other conventional programmable logic controllers and suitable software may be used to implement the present invention as described below.

The present invention will now be described in conjunction with exemplary conditions graphically depicted in of FIG. 4. The present invention determines when and if to switch the shunt reactances either into or out of the network to increase or decrease voltage to the load. However, in order to eliminate hunting and excessive reactance switching (either on and off), it is desirable to include a "deadband" range around ideal operating voltage and power conditions. This deadband range is defined as the region between the two solid diagonal lines shown in FIG. 4. The present invention defines the deadband range based on a decision variable $X(V, Q)$ which is a function of voltage and power flow to the load. While the present invention will be described below using primary voltage and reactive power, it is to be understood by those skilled in the art that other voltages including the secondary voltage as well as real power, could be utilized as the voltage and power parameters, respectively. Initially, an operator sets predetermined upper and lower limits for both primary voltage and reactive power flow. In the example shown in FIG. 4, reactive power flow (in MVAR) is recorded on the vertical scale with $Q_{min} = -10$ and $Q_{max} = 10$. On the horizontal scale, normalized primary voltage (in per unit "pu") includes $V_{min} = 1.0$ and $V_{max} = 1.025$. Four midpoints 1-4 are determined for each side of a rectangle formed by the $Q_{min}$, $Q_{max}$, $V_{min}$, and $V_{max}$ threshold limits (indicated by dashed lines). For example, midpoint 1 is the point at zero reactive power flow halfway between the upper and lower reactive power limits $Q_{max}$ and $Q_{min}$.

Two parallel diagonal lines are determined which intersect midpoints 1 and 2 and midpoints 3 and 4, respectively. These two diagonal lines define the boundaries of the permissible deadband operation and are defined mathematically as $$X_{low} = V_{min} - kQ_{mid}$$

$$X_{high} = V_{max} - kQ_{mid}$$

The gain or slope variable k is calculated as $$k = \frac{(V_{max} - V_{min})}{(Q_{max} - Q_{min})}$$

and $Q_{mid}$ is defined as $$Q_{mid} = Q_{min} + \frac{(Q_{max} - Q_{min})}{2}$$

The decision function X determines the extent to which the actually measured voltage and reactive power vary from the deadband range defined by diagonal lines $X_{high}$ and $X_{low}$. Thus, the actual operating point of the system at any point in time can be determined using the function $$X(V_{act}, Q_{flow}) = V_{act} - kQ_{flow}$$

where:

$V_{act}$ is the measured high voltage;
k is a gain parameter relating voltage and reactive power flow ranges;
$Q_{flow}$ is the measured reactive power flowing to the load;
$V_{min}$ is the low primary voltage limit;
$V_{max}$ is the high primary voltage limit;
$Q_{min}$ is the low reactive power flow limit;
$Q_{max}$ is the high reactive power flow limit;
$Q_{mid}$ is the midpoint of the reactive flow range.

Figure 4:
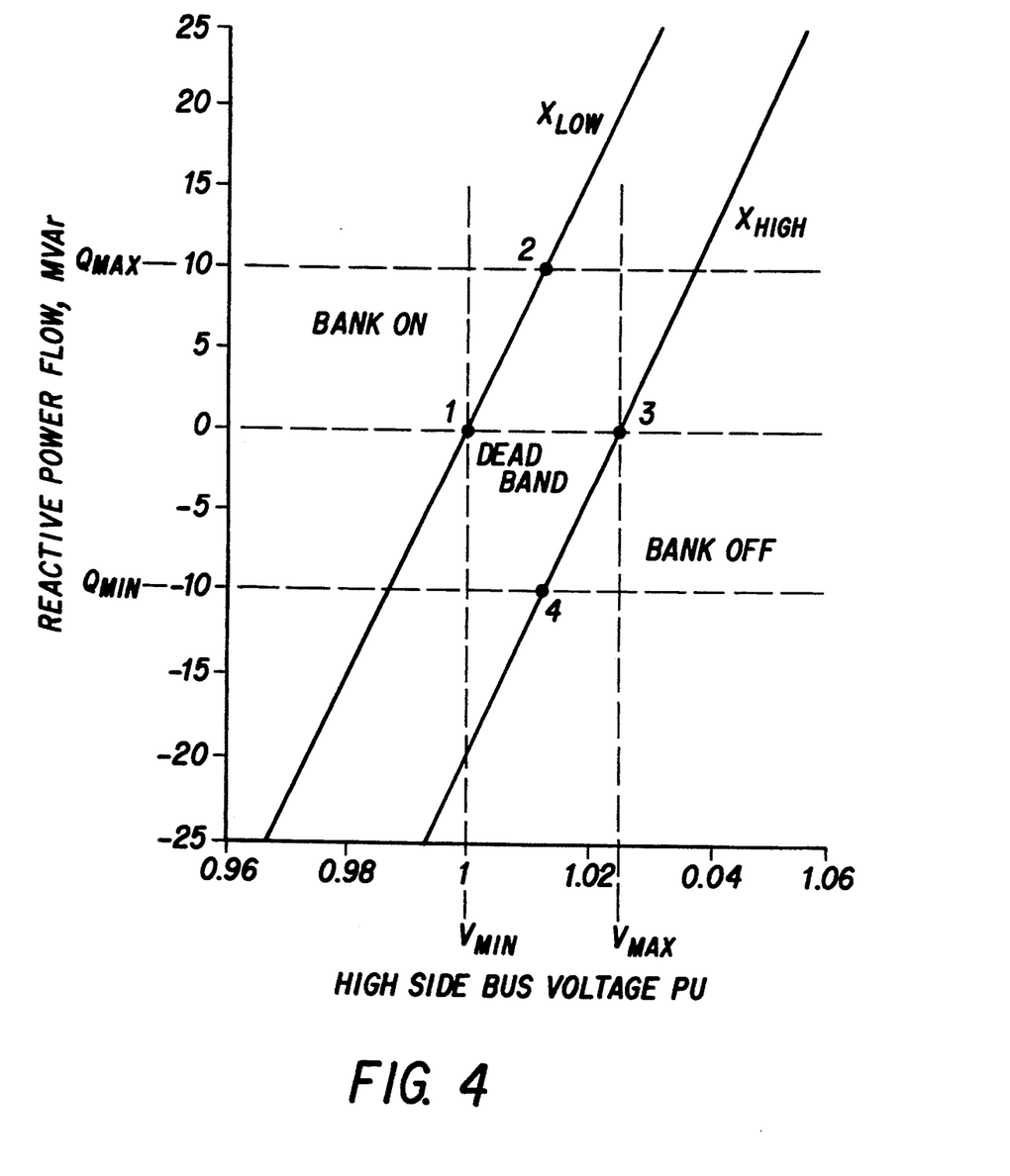
FIG. 4 is a graphic depiction of the mathematical model employed in the present invention.

To calculate the decision function X for the example shown in FIG. 4 consider the following values:

$V_{min} = 1.00$ pu Volts;
$V_{max} = 1.026$ pu Volts;
$V_{mid} = -10.0$ MVAR;
$Q_{max} = 10.0$ MVAR;
$Q_{mid} = 0.0$ MVAR;
k equals $0.026/20.0 = 0.0013$ (pu Volts/MVAR);
$X_{low} = 1.000$ pu Volts;
$X_{high} = 1.026$ pu Volts.

In a first calculation pass, programmable logic controller 30 calculates values k, $X_{low}$, $X_{high}$ based on input limit values $Q_{min}$, $Q_{max}$, $V_{min}$, $V_{max}$ and the midpoint reactive power value $Q_{mid}$. Subsequently, based on the actual voltage and reactive power flow measurements from volt meter 20 and power meter 22, programmable logic controller 30 determines decision function $X(V, Q)$. For example, if the primary voltage is 0.99 pu and the reactive power flow is 5 MVAR, $X = 0.99 - (0.0013 \times 5.0) = 0.9835$. Programmable logic controller 30 then compares X to the $X_{low}$ and $X_{high}$ values to determine if X is outside the deadband range of operation. Since 0.9835 is less than $X_{low} = 1.000$ programmable logic controller 30 starts a timer to accumulate/integrate a voltage error.

An error for low conditions is defined as $ERR1 = X_{low} - X$ and for high conditions is defined as $ERR2 = X - X_{high}$. Error values ERR1 or ERR2 are integrated over time and when the integrated value reaches a predetermined threshold, appropriate reactance switching is initiated. As shown in FIG. 4, if ERR1 exceeds its threshold, a capacitor reactance bank is switched on. Conversely, if ERR2 exceeds its threshold, the programmable logic controller 30 switches a capacitor reactance bank into the network. The threshold value may be, for example, 1.0 pu Volt seconds to allow for gradual changes in load or voltages and for quick response in contingency conditions. In this instance, a ten percent (0.10 pu) voltage error causes reactance switching in ten seconds while a one percent (0.01 pu) voltage error requires one hundred seconds for switching.

Programmable logic controller 30 only accumulates errors when X is outside of the deadband range. If X returns inside the deadband before a reactance switching signal is generated, integrated errors are reset to zero.

Figure 5:
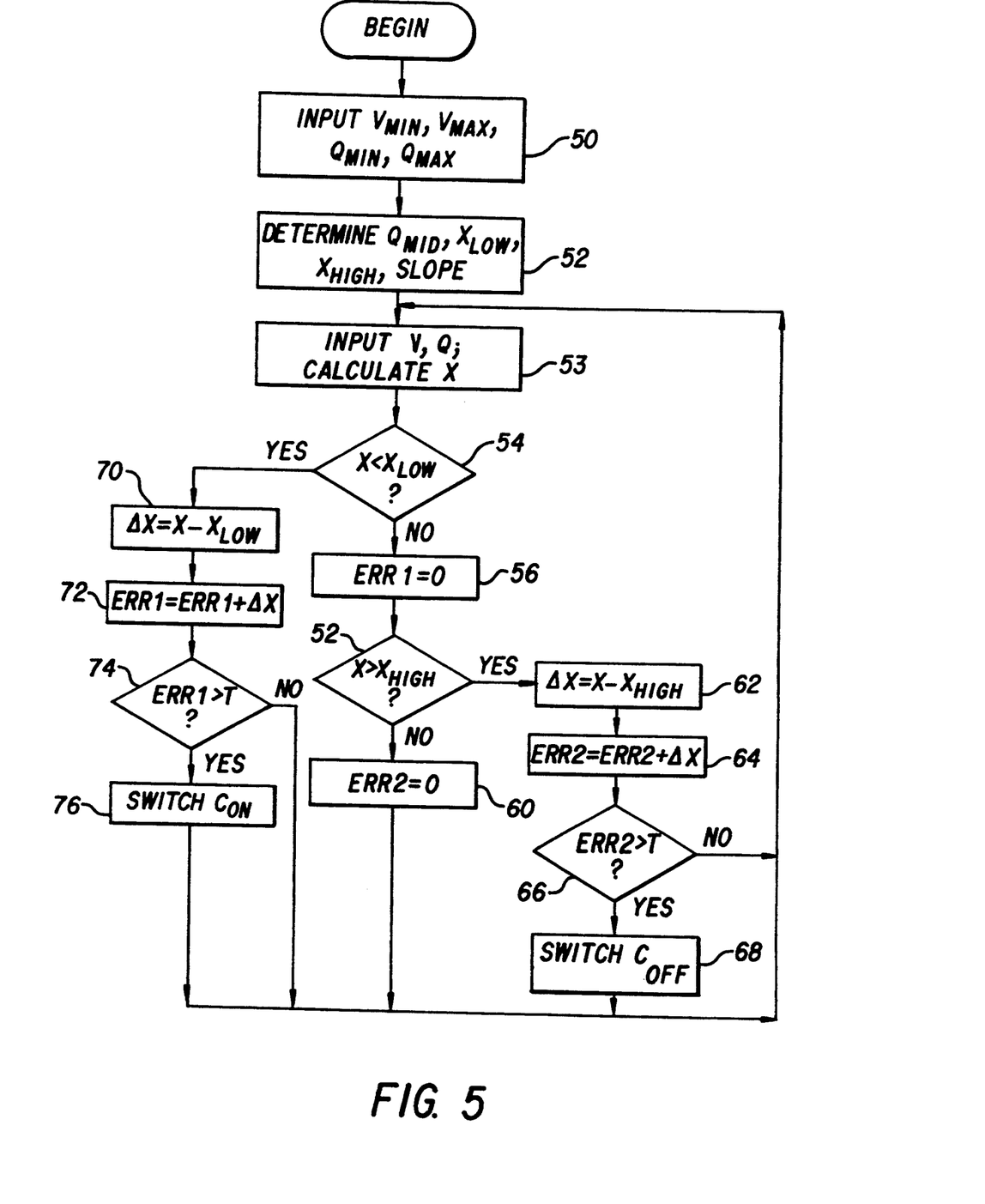
FIG. 5 is a flow diagram illustrating exemplary processes which may be used for carrying out the present invention.
Figure 6A:
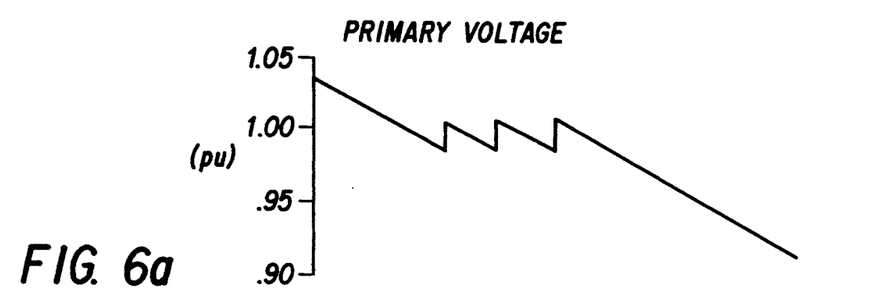
FIGS. 6(a)-(f) through 8(a)-(f) are graphs showing the operation of the present invention under various operating conditions.
Figure 6B:
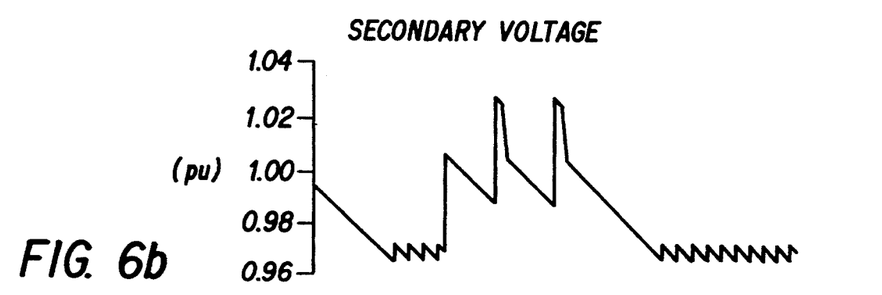
Figure 6C:
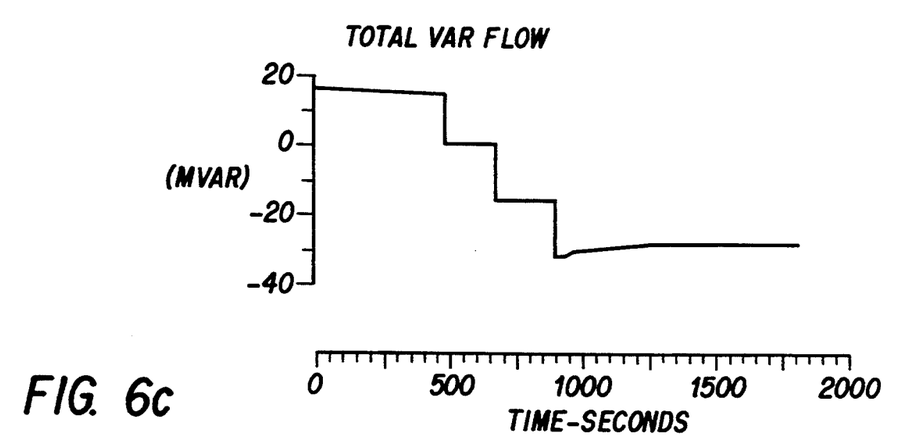
Figure 6D:
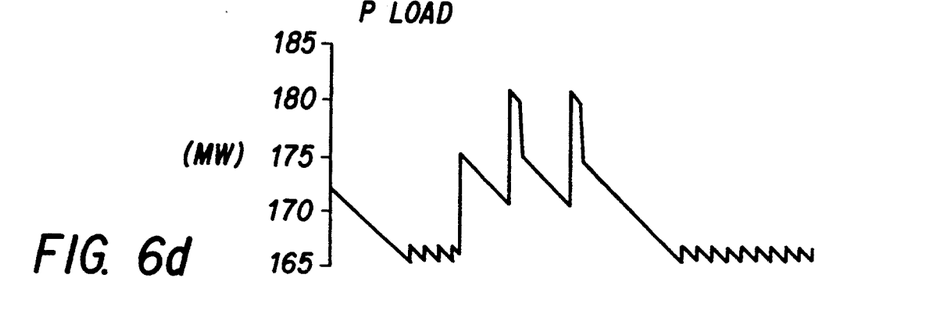
Figure 6E:
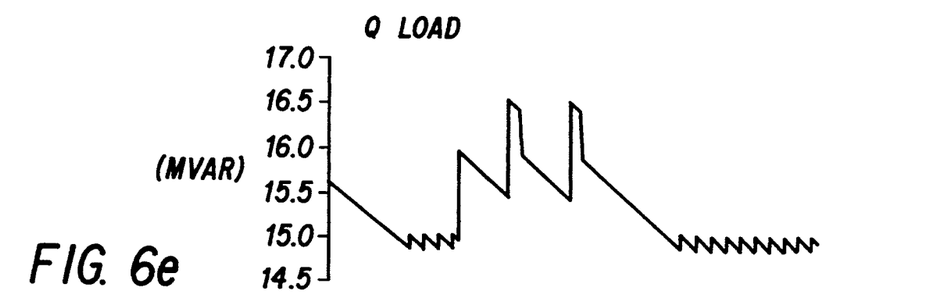
Figure 6F:
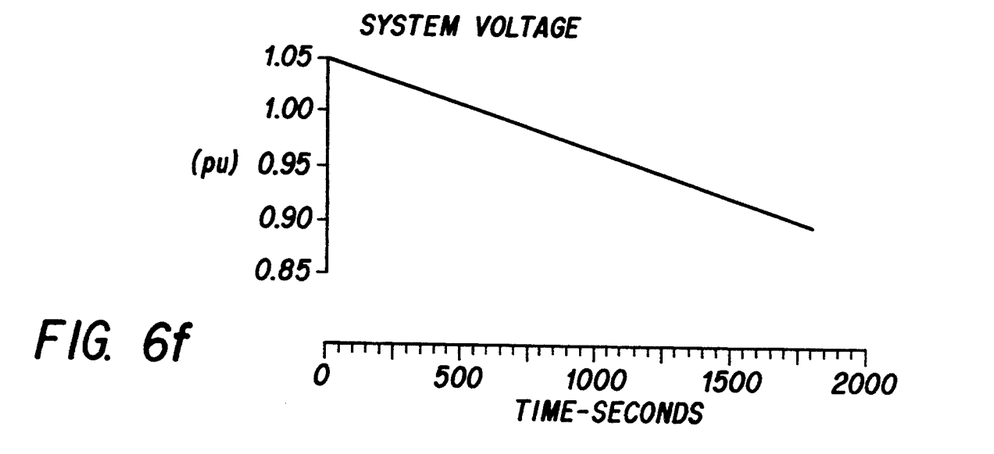
Figure 7A:
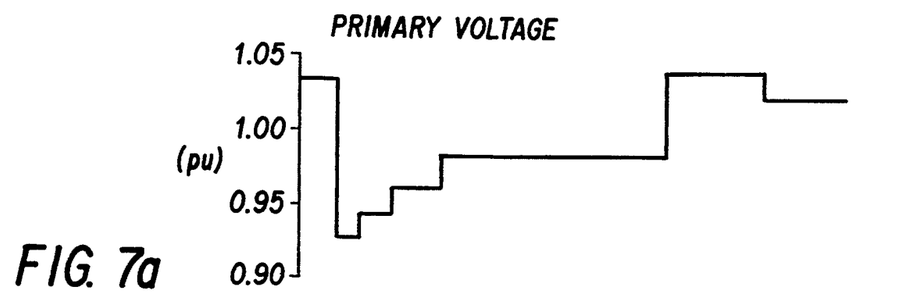
Figure 7B:
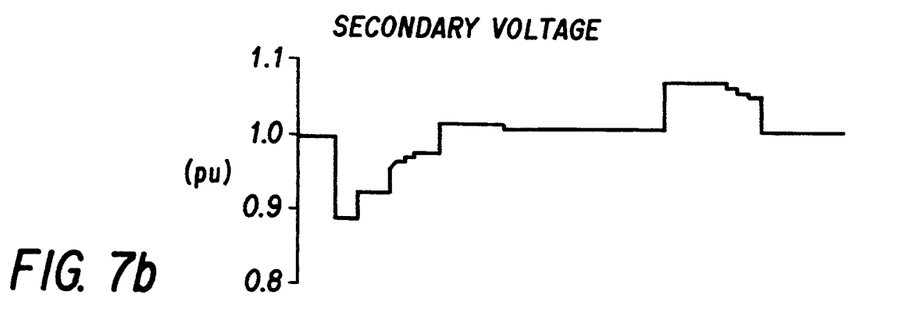
Figure 7C:
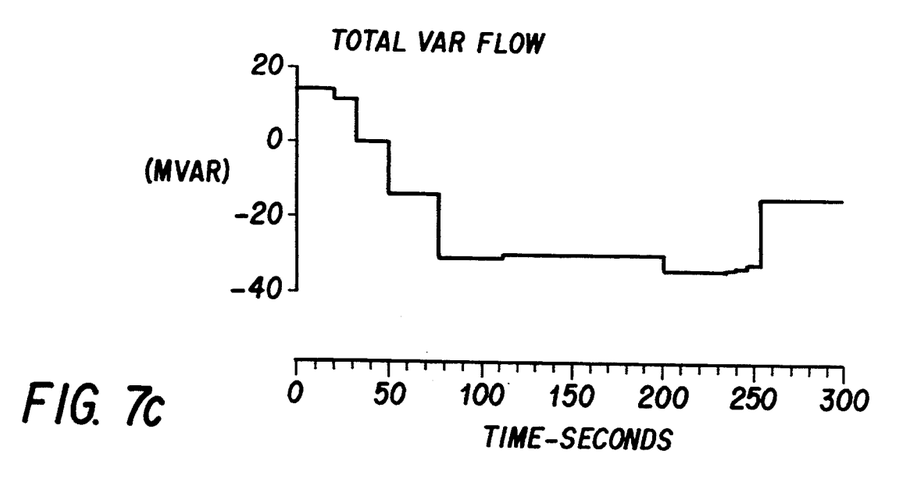
Figure 7D:
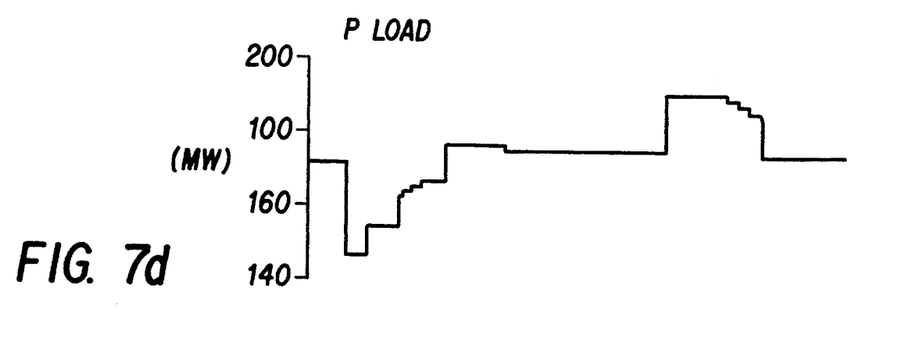
Figure 7E:
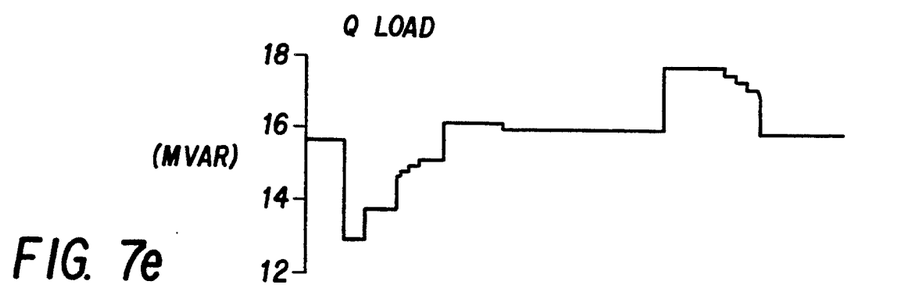
Figure 7F:
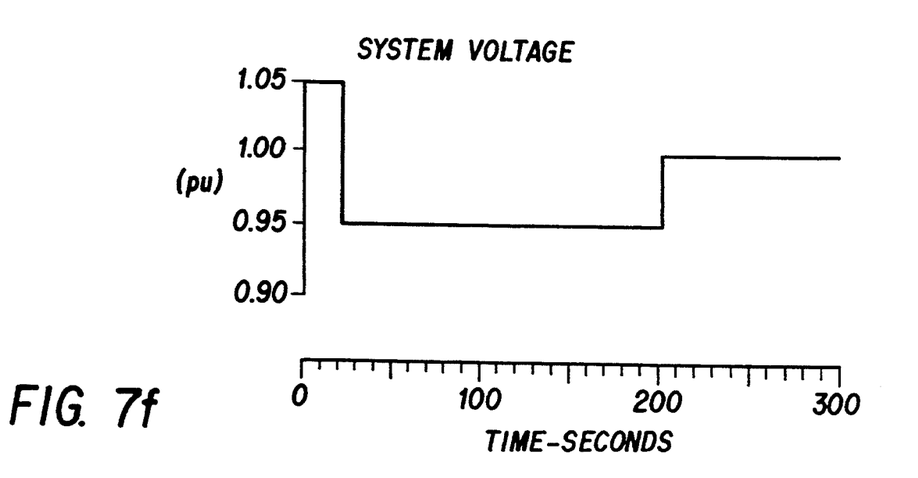
Figure 8A:
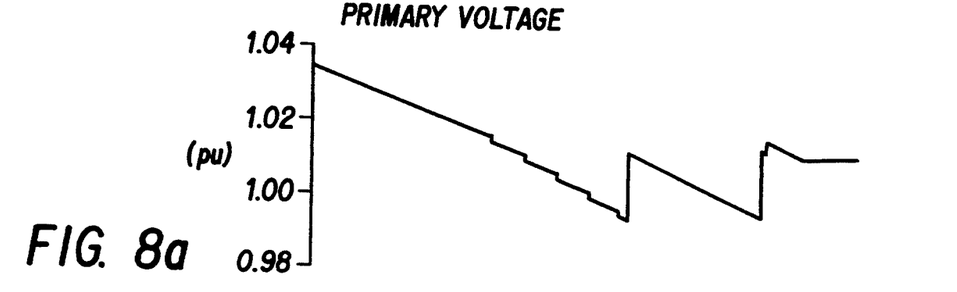
Figure 8B:
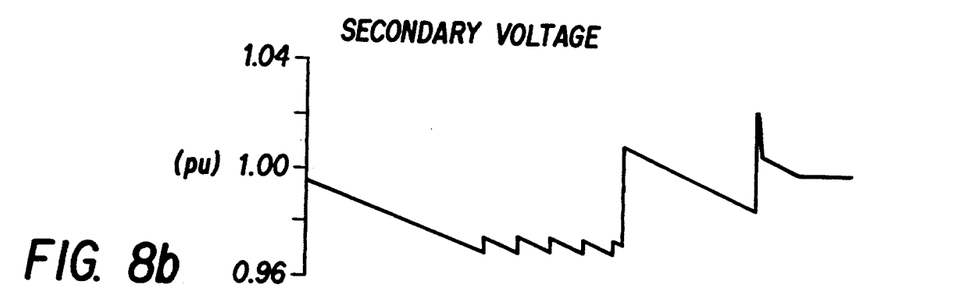
Figure 8C:
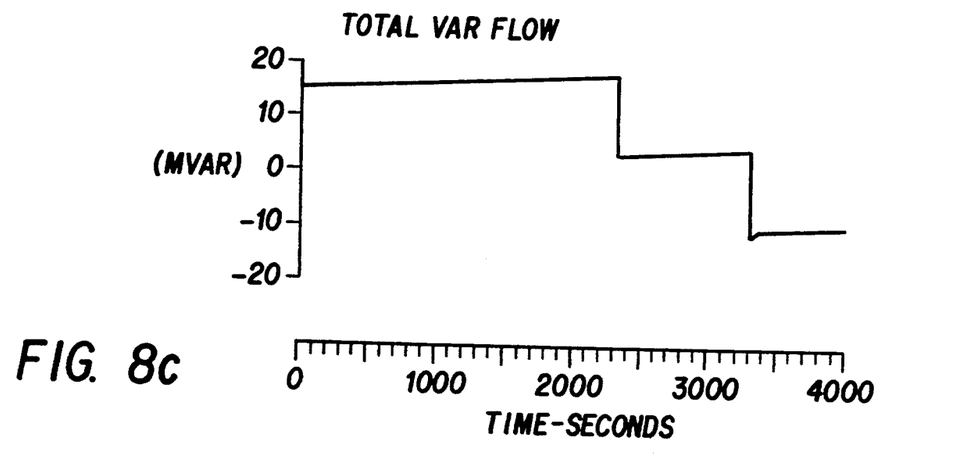
Figure 8D:
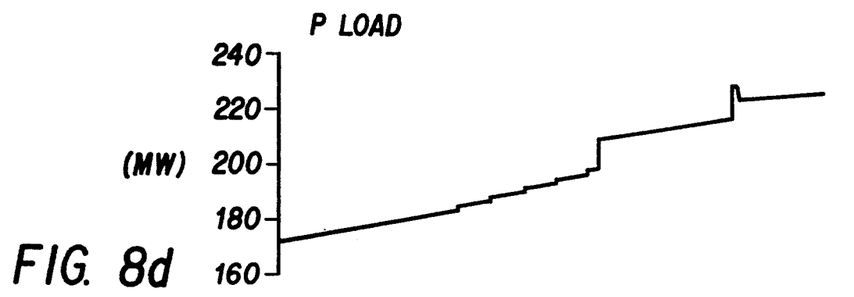
Figure 8E:
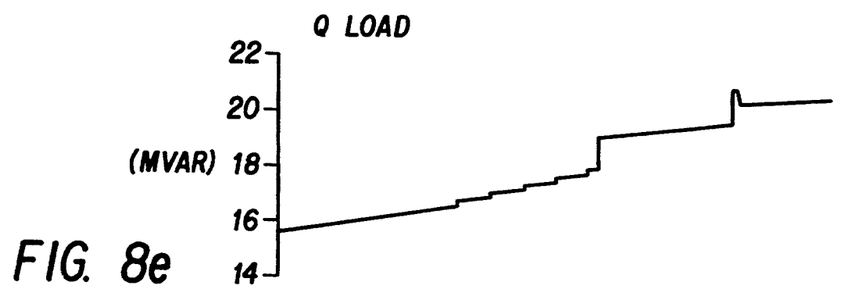
Figure 8F:
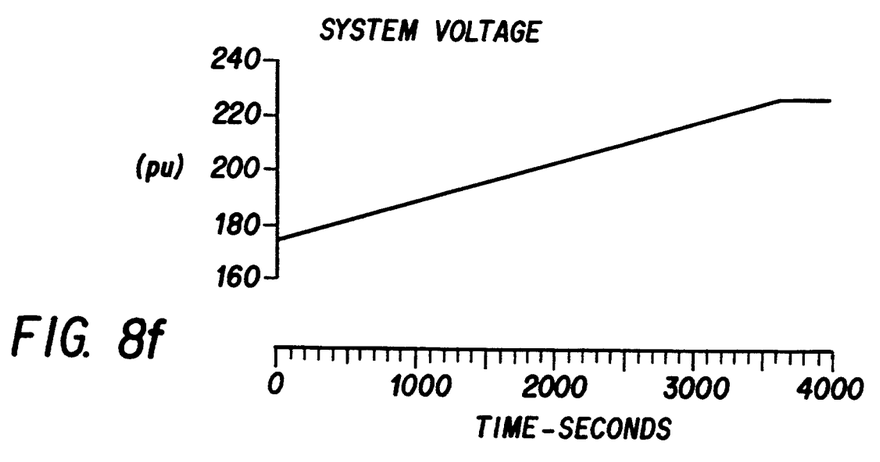

Reference will now be made to the exemplary flow diagram illustrated in FIG. 5. The programmable logic controller 30 initially inputs values $V_{min}$, $V_{max}$, $Q_{min}$, $Q_{max}$ preset by an operator (block 50). An initial pass of calculations is made to determine $Q_{mid}$, $X_{low}$, $X_{high}$ (block 52). After these initialization steps, programmable logic controller 30 receives voltage and reactive power inputs from volt meter 20 and power meter 22, respectively, and calculates X (block 53) using the formula described above.

A first comparison is made to determine if X is less than $X_{low}$ (block 54). If so, $\Delta X$ is calculated by subtracting X from $X_{low}$ (block 70) and accumulated (block 72). If accumulated error ERR1 is greater than a threshold value (T) (block 74), then reactance switching occurs, i.e. a capacitor is switched on or an inductor is switched off (block 76). If X was equal or greater to $X_{low}$, ERR1 is reset to zero (block 56).

A second comparison is made to determine if X is greater than $X_{high}$ (block 58). If so, a second $\Delta X$ value is determined by subtracting $X_{high}$ from X (block 62). An error value ERR2 is accumulated (block 64) and compared with the threshold (T) (block 66). If ERR2 exceeds the threshold, reactance switching occurs (block 68). If X is less than $X_{high}$, ERR2 is reset to zero (block 60). At the end of all process flows, control is returned to block 53 to repeat the process for newly measured voltage and power values.

Exemplary operation of the present invention is illustrated by a set of computer simulations illustrated in FIGS. 6(a)-(f) through 8(a)-(f). In these simulations, a simple radial model was created to represent a 115 kV system with a 115-26 kV LTC transformer and station load. Three 15.5 MVAR capacitor banks serve as shunt reactances, and the various limits correspond to voltage and reactive power limits described in the example above.

FIGS. 6(a)-6(f) show the response to a gradual decline in system transmission voltage from 1.05 pu to 0.9 pu over a thirty minute period. As system voltage drops, low side or secondary voltage also drops, and LTC controller 16 reacts to maintain the low side voltage within predetermined limits (as represented by the small, sawtooth waveform in the low side voltage graph). When the 115 kV high side or primary voltage drops below 1.0 pu, error ERR1 starts to accumulate. When ERR1 reaches a threshold at 450 seconds for example, a first shunt capacitor C1 is switched into the network. As a result, both primary and secondary voltages rise. As transmission voltage drops further, a second capacitor C2 is switched on at 650 seconds. At this switching point, however, the secondary voltage exceeds an upper limit and the LTC controller 16 reacts to decrease the voltage. At approximately 900 seconds, reactive power flow drops below the specified $Q_{min}$ with the primary voltage depressed causing switching of the third capacitor C3.

FIGS. 7(a)-7(f) illustrate the response of the present invention to a sharp change in system voltage such as that caused by a system fault. The initial voltage is 1.05 pu which drops to 0.95 pu at twenty seconds. With a sharp drop in the primary voltage, the first capacitor C1 is switched on immediately to increase primary and secondary voltages. However, since these voltages do not reach within deadband limits, the second and third capacitors C2 and C3 are also switched on. The LTC controller 16 fine tunes the secondary voltage at approximately 110 seconds. At 200 seconds, system voltage is stepped back up to 1.0 pu with the LTC operating in conjunction with removal of one capacitor bank to reduce the secondary voltage.

FIGS. 8(a)-8(f) show a steady increase in station load. For slow changes in system conditions, the LTC controller 16 acts initially, and then at 2300 seconds, a first capacitor bank is switched on followed by a second capacitor bank at 3300 seconds to counteract load increases.

In all three scenarios in FIGS. 6(a)-(f) through 8(a)-(f), switching of the shunt capacitors is well coordinated with the LTC controller fine tune adjustments. The coordinated system of the present invention allows for flexible, programmable, and dynamic response to actual changing load conditions whether normal or abnormal, steady state or transient. Moreover, variable deadband response is programmably controlled simply by changing the user inputs to programmable controller 30.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for switching a shunt reactance at a power distribution station including a LTC transformer connected on a primary side to a high voltage transmission system and on a secondary side to a low voltage distribution system for supplying low voltage to a load, comprising:
    at least one reactance switchably connectable in shunt to said load;
    a tap controller for adjusting the position of an adjustable tap contacting windings on said secondary side in response to variations in said low voltage;
    means for measuring voltage at said primary side and reactive power flowing to said load;
    a programmable logic controller for switching said at least one reactance to maintain said low voltage substantially constant based on measurements from said measuring means and on predetermined ranges for said primary side voltage and reactive power, wherein said programmable logic controller calculates a deadband range of operation in which no reactance is switched and outside of which reactance is switched, said deadband range being determined based on said primary side voltage and reactive power limits and a slope of a line intersecting midpoints between said reactive power limits, said programmable logic means including:
        means for determining a decision value based on measured primary side voltage, measured reactive power, and said slope;
        means for detecting when said decision value is outside of said deadband range and calculating an error;
        means for accumulating said error; and
        means for initiating reactance switching when said accumulated error exceeds a preset threshold.

2. The system according to claim 1, wherein said at least one reactance includes plural capacitor banks and said programmable logic controller connects one or more of said capacitor banks in shunt with said load to increase said low voltage and disconnects said one or more capacitor banks to decrease said low voltage.

3. The system according to claim 1, wherein said accumulating means is reset if said decision value is inside said deadband range.

4. A system for controlling shunt reactance switching at a power distribution station connected to a high voltage transmission system and a low voltage distribution system, said low voltage distribution system supplying low voltage power to a load, comprising:

means for measuring voltage supplied by said high voltage transmission system and power flowing to said load;

a programmable logic controller for switching at least one reactance in shunt with said load to maintain said low voltage substantially constant based on said voltage and power measurements from said measuring means and predetermined ranges for said primary voltage and power, wherein said programmable logic controller calculates a deadband range of operation in which no reactances are switched and outside of which reactances are switched, said deadband range being determined based on said transmission system voltage and reactive power limits and a slope of a line intersecting a midpoint between said reactive power limits, said programmable logic controller including:

means for determining a decision value based on measured transmission system voltage, measured reactive power flow, and said slope;

means for detecting when said decision value is outside of said deadband range and calculating an error;

means for accumulating said error; and means for initiating reactance switching when said accumulated error exceeds a preset threshold.

5. A system according to claim 4, wherein said power is either reactive or real power.

6. The system according to claim 4, wherein said accumulating means is reset if said decision value is inside said deadband.

7. A system for regulating shunt reactance switching at a power distribution substation connected to a high voltage transmission line and a low voltage distribution line for supplying power to a load, comprising:

means for measuring voltage supplied by said high power transmission line and reactive power flowing to said load;

programmable logic means for switching at least one reactance in shunt with said load to maintain voltage on said low voltage distribution line substantially constant based on voltage and power measurements from said measuring means and predetermined ranges for said transmission line voltage and said reactive power, wherein said programmable logic means calculates a deadband range of operation in which no reactances are switched and outside of which reactances are switched, said deadband range being determined based on transmission line voltage and reactive power limits and a slope of a line intersecting midpoints between said reactive power limits, wherein said programmable logic means includes:

means for determining a decision value based on measured transmission line voltage, measured reactive power, and said slope;

means for detecting when said decision value is outside of said deadband and calculating an error;

means for accumulating said error; and means for initiating reactance switching when said accumulated error exceeds a preset threshold.

8. The system according to claim 7, wherein said accumulating means is reset if said decision value is inside said deadband.

9. A method for switching a shunt reactance at a power distribution station, said power distribution station including a LTC transformer connected at a primary winding to a high voltage transmission system and at a secondary winding to a low voltage distribution system for supplying low voltage to a load, comprising:

adjusting the position of an adjustable tap contacting windings on said secondary winding in response to variations in said low voltage;

measuring voltage supplied by said transmission system and reactive power flowing to said load;

switching at least one reactance in shunt with said load to maintain said low voltage substantially constant based on said voltage and reactive power measurements and on predetermined ranges for said transmission system voltage and reactive power;

inputting said predetermined ranges including a minimum load voltage, maximum load voltage, a minimum reactive power, and a maximum reactive power;

calculating a deadband range of operation in which no reactances are switched and outside of which reactances are switched based on said predetermined ranges;

calculating a slope of intersecting a midpoint between said minimum reactive power and said maximum reactive power;

determining a decision value based on measured high side transmission bus voltage, measured reactive power, and said slope;

comparing said decision value to said deadband range and calculating an error when said decision value is outside said deadband range;

accumulating said error; and initiating reactance switching when said accumulated error exceeds a preset threshold.

10. A method according to claim 9 further comprising:

resetting said accumulated error if said decision value is inside said deadband.

11. A method for regulating shunt reactance switching in a power distribution station connected to a high side transmission bus and a low side distribution bus for supplying power to a load comprising:

measuring a voltage on said high side transmission bus and reactive power flowing to said load, and switching at least one reactance in shunt with said load to maintain voltage supplied to said load substantially constant based on said measurements and predetermined ranges for said high side transmission bus voltage and said reactive power;

inputting said predetermined ranges including a minimum load voltage, a maximum load voltage, minimum reactive power, and a maximum reactive power;

calculating a deadband range of operation in which no reactances are switched and outside of which reactances are switched based on said predetermined ranges;

calculating a slope of a line intersecting a midpoint between said minimum reactive power and said maximum reactive power;

determining a decision value based on measured high side transmission bus voltage, measured reactive power, and said slope;

comparing said decision value to said deadband range and calculating an error when said decision value is outside said deadband range;

accumulating said error; and initiating reactance switching when said accumulated error exceeds a preset threshold.

12. The system according to claim 11 further comprising:

resetting said accumulated error if said decision value is inside said deadband range.

* * * * *